Patented Jan. 25, 1938

2,106,383

UNITED STATES PATENT OFFICE 2,106,383

MANUFACTURE OF CARBOCYANINE DYES

Wilhelm Schneider, Dessau in Anhalt, Germany, assignor to I. G. Farbenindustrie Aktiengesellschaft, Frankfort-on-the-Main, Germany No Drawing. Application June 4, 1934, Serial No. 729,031. In Germany June 10, 1933

3 Claims. (Cl. 260—44)

My present invention relates to the manufacture of polymethine dyestuffs.

One of its objects is a process of producing polymethine dyestuffs. Further objects will be seen from the detailed specification following hereafter.

It is known that polymethine dyestuffs substituted at the middle carbon atom of the polymethine chain can be made by condensing ortho-carboxylic acid esters with quaternary ammonium salts of nitrogenous heterocyclic bases. The production of some of the ortho-esters necessary for the process is complicated, whilst many ortho-esters are not yet known and cannot be prepared by the usual methods.

By the present invention polymethine dyestuffs substituted in any manner at the middle carbon atom of the polymethine chain can be made by causing a quaternary ammonium salt of a nitrogenous heterocyclic base containing a reactive methyl group in α-position and having, for instance, the general formula (1) 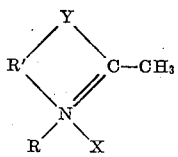

to react with an unsubstituted or substituted acid amide, such as an amide of the general formula (2) 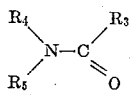

in the presence of a solvent or condensing agent.

R = alkyl
R' = vinylene, phenylene, naphthylene, and so on
Y = sulfur, selenium
X = Cl, Br, I, SO$_4$CH$_3$, ClO$_4$, or another acid radical.

In Formula (2)

R$_3$ = hydrogen, alkyl, aralkyl, aryl, or a substituted aryl group, or a hydroaromatic or heterocyclic group
R$_4$ and R$_5$ = alkyl, aralkyl, aryl, or a substituted aryl group.

Particularly suitable for the condensation are the substituted acid amides of the general formula

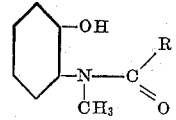

which are obtainable by fission of oxazoles substituted in α-position to the nitrogen, by the process described in my Patent No. 2,048,821. Particularly reactive is the acetalized substituted acid amide which is formed in the course of this fission, and from which the substituted acid amide itself is obtained by the action of acid.

The invention permits the production of dyestuffs which are substituted at the middle carbon atom of the polymethine chain by radicals of various kinds. For example, by causing ortho-aminophenol to react with the corresponding carboxylic acid to form a benzoxazole substituted in 2-position, splitting this product by treatment with sodium ethylate to form the correspondingly substituted acid amide acetal and converting the acid amide acetal into the substituted acid amide by treatment with the acid. In this manner there can be produced substituted amides of lower and high fatty acids,
of heterocyclic carboxylic acids,
of aromatic acids,
of aryl-substituted fatty acids,
of carbocyclic carboxylic acids, and these may be condensed in accordance with the invention to produce the corresponding meso-substituted carbocyanines.

The course of the reaction in producing a dye will now be shown for the case when condensing benzthiazole (1) with the amide obtained by splitting 2-ethylbenzoxazole, and (2) with the acetalized form of this amide (1) 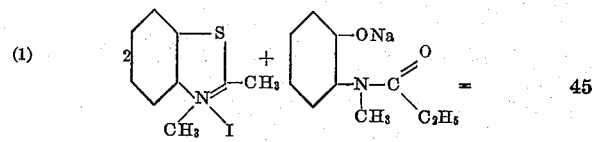

acid amide

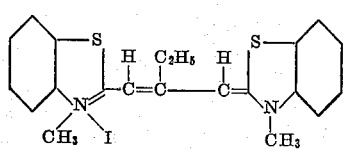

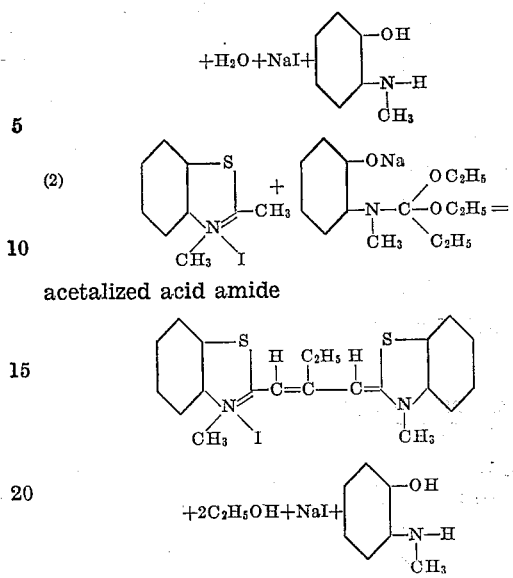

acetalized acid amide

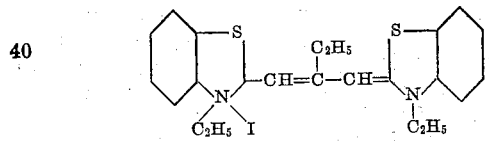

The dyestuffs substituted at the middle carbon atom of the polymethine chain by higher alkyl groups are extraordinarily freely soluble in alcohol and in contrast to the dyestuffs substituted by alkyl groups containing a small number of carbon atoms, they dissolve in ether, benzene and the like, their solubility in these solvents increasing with the number of carbon atoms in the alkyl group.

The following examples illustrate the invention:

*Example 1.*—For making 1,1'-diethyl-mesoethyl-benzthio-carbocyanine iodide of the probable formula

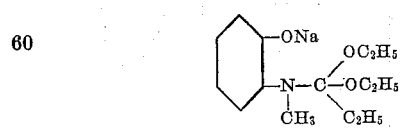

15 grams of 2-ethylbenzoxazole ($\frac{1}{10}$ mol.) and 12 cc. of dimethylsulfate ($\frac{1}{10}$ mol.) are heated together on the water bath until reaction occurs. After cooling, the 2-ethylbenzoxazole dimethylsulfate which is formed solidifies to a crystalline mass.

2.7 grams of 2-ethylbenzoxazole dimethylsulfate ($\frac{1}{100}$ mol.) are dissolved in a small quantity of absolute alcohol, and then there are added 8 cc. of a sodium ethylate solution (1 mol. sodium to 400 cc. of alcohol), equal to $\frac{2}{100}$ mol. and the whole is heated for a short time on the water bath. The solution contains the acetalized acid amide of the probable formula To the alcoholic solution of the acetalized acid amide there are added 6 grams of 2-methylbenzthiazole ethiodide (about $\frac{2}{100}$ mol.) and the solution is boiled for about 30 to 60 minutes. After cooling, the dyestuff crystallizes.

*Example 2.*—In order to prepare 1,1'-diethyl-mesoethylbenzseleno-carbocyanine iodide, there are added to the alcoholic solution of acetalized substituted acid amide prepared as described in Example 1, 6.5 grams of 2-methylbenzselenazole ethiodide (about $\frac{2}{100}$ mol.) and the whole is boiled for about 30 to 60 minutes. After the solution has cooled, the dyestuff separates. It has probably the following formula

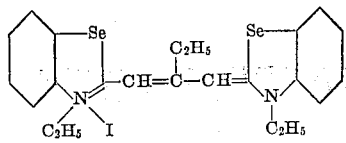

*Example 3.*—For making 1,1'-diethyl-mesopropyl-benzthiocarbocyanine iodide, 16 grams of 2-propylbenzoxazole are heated on the water bath with 12 cc. of dimethylsulfate. The 2-propylbenzoxazole-dimethylsulfate thus formed is split by heating with sodium ethylate in the manner indicated in Example 1, so as to form the corresponding acetalized substituted butyric acid amide and the latter is condensed with 2-methyl-benzthiazole ethiodide to form the dyestuff of the probable formula

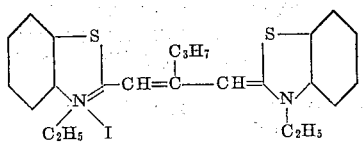

*Example 4.*—For making 1,1'-diethyl-mesopropyl-benzseleno-carbocyanine iodide, the substituted acetalized butyric acid amide made as described in Example 3 is condensed with 2-methylbenzselenazole ethiodide to form the dyestuff of the probable formula

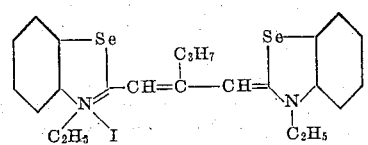

*Example 5.*—In order to make 1,1'-diethyl-mesopentadecyl-thiocarbocyanine iodide, 109 grams of ortho-aminophenol and 256 grams of palmitic acid are heated together at 200° C. until 2 molecular proportions of water (36 cc.) have distilled. The 2-pentadecyl-benzoxazole thus formed is distilled under a reduced pressure. The 2-pentadecyl-benzoxazole dimethylsulfate, obtained by addition of dimethylsulfate to the base, is heated with sodium ethylate solution and the substituted acetalized amide of palmitic acid thus formed is condensed with 2-methylbenzthiazole ethiodide to form the dyestuff of the probable formula

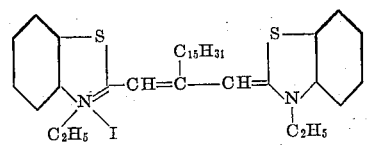

*Example 6.*—By condensation of 2-methylbenzselenazole ethiodide with the substituted acetalized palmitic acid amide prepared as described in Example 5, there is obtained the 1,1'-diethyl-mesoheptadecyl-selenocarbocyanine iodide of the probable formula

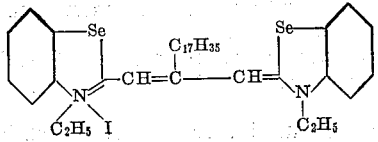

*Example 7.*—For making 1,1'-diethylmesocyclohexylthiocarbocyanine iodide, 128 grams of cyclohexylcarboxylic acid and 109 grams of orthoaminophenol are heated together at 150°–200° C. until 2 molecular proportions of water (36 cc.) have distilled, and the temperature is then raised until the 2-cyclohexyl-benzoxazole distils. After conversion of the latter into its dimethylsulfate, treatment with sodium ethylate yields an acetalized substituted amide of cyclohexylcarboxylic acid. By condensation of this amide with 2-methylbenzthiazole ethiodide, the dyestuff of the probable formula is obtained

*Example 8.*—By condensation of the substituted acetalized amide of cyclohexyl-carboxylic acid, made as described in Example 7, with 2-methylbenzselenazole ethiodide, there is obtained 1,1'-diethyl-mesocyclohexylselenocarbocyanine iodide of the probable formula

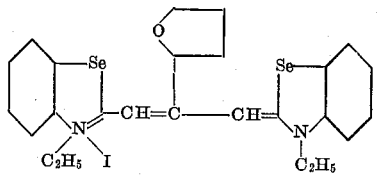

*Example 9.*—For making 1,1'-diethylmesofurylbenzthiocarbocyanine iodide, 109 grams of orthoaminophenol and 112 grams of pyromucic acid are heated together at 150 to 200° C. until 36 cc. of water have distilled. Then the temperature is raised so as to cause the furylbenzoxazole thus formed to distil. By treatment of the dimethyl sulfate of the base with sodium ethylate there is obtained the corresponding substituted acetalized amide of furane-carboxylic acid. By condensation of this amide with 2-methylbenzthiazole ethiodide, there is obtained the dyestuff of the probable formula

*Example 10.*—By condensation of the substituted acetalized amide of furane-carboxylic acid, made as described in Example 9, with 2-methyl-benzselenazole ethiodide, there is obtained 1,1'-diethyl-mesofuryl-selenocarbocyanine iodide of the probable formula The meso-furyl-substituted dyestuffs made as described in Examples 9 and 10 are distinguished by a particularly large displacement of the absorption maximum in the direction of the longwave region of the spectrum.

What I claim is:

1. A process of producing a trimethine cyanine substituted at the central carbon atom, which comprises condensing with the application of heat the acid amide which is obtained by treating with a strong alkali a quaternary ammonium salt of an oxazole substituted in α-position to the nitrogen atom by a radical selected from the group consisting of alkyl, aralkyl, aryl, a hydroaromatic group and a heterocyclic group, with a quaternary ammonium salt of an azole selected from the group consisting of 2-methylbenzthiazole, 2-methylbenzselenazole, 2 - methylnaphththiazole and 2-methylnaphthselenazole.

2. A process of producing a trimethine cyanine substituted at the central carbon atom, which comprises condensing with the application of heat the acid amide acetal which is obtained by treating with a solution of sodium ethylate a quaternary ammonium salt of an oxazole substituted in α-position to the nitrogen atom by a radical selected from the group consisting of alkyl, aralkyl, aryl, a hydroaromatic group and a heterocyclic group, with a quaternary ammonium salt of an azole selected from the group consisting of 2-methylbenzthiazole, 2-methylbenzselenazole, 2-methylnaphththiazole and 2-methylnaphthselenazole.

3. A process of producing a trimethine cyanine substituted at the central carbon atom, which comprises condensing with the application of heat the acid amide which is obtained by treating a quaternary ammonium salt of an oxazole substituted in α-position to the nitrogen atom by a radical selected from the group consisting of alkyl, aralkyl, aryl, a hydroaromatic group, and a heterocyclic group with a solution of sodium ethylate and converting the substituted acid amide acetal into the acid amide by treatment with an acid, with a quaternary ammonium salt of an azole selected from the group consisting of 2-methylbenzthiazole, 2-methylbenzselenazole, 2-methylnaphththiazole and 2-methylnapthselenazole.

WILHELM SCHNEIDER.